United States Patent
Magaldi et al.

(10) Patent No.: US 11,811,581 B2
(45) Date of Patent: Nov. 7, 2023

(54) IPDR COMMUNICATION SYSTEM FOR VIRTUALIZED CORE SOURCES

(71) Applicant: ARRIS Enterprises LLC, Suwanee, GA (US)

(72) Inventors: Robert Magaldi, North Andover, MA (US); Karthik Rajalingari, Cupertino, CA (US); Mark Vaysman, Swampscott, MA (US); Santhana Chari, Johns Creek, GA (US); Timothy Dillon, Westford, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/580,587

(22) Filed: Jan. 20, 2022

(65) Prior Publication Data

US 2022/0231931 A1    Jul. 21, 2022

Related U.S. Application Data

(60) Provisional application No. 63/139,941, filed on Jan. 21, 2021.

(51) Int. Cl.
*H04N 7/173* (2011.01)
*H04L 41/0213* (2022.01)
*H04N 21/61* (2011.01)

(52) U.S. Cl.
CPC ..... *H04L 41/0213* (2013.01); *H04N 21/6118* (2013.01)

(58) Field of Classification Search
CPC ........... H04N 21/2404; H04N 21/2405; H04N 21/254; H04N 21/6118; H04L 43/20; H04L 43/065; H04L 41/0213
See application file for complete search history.

(56) References Cited

U.S. PATENT DOCUMENTS

| | | | |
|---|---|---|---|
| 2017/0127144 A1* | 5/2017 | Dai | H04N 21/6125 |
| 2018/0192327 A1* | 7/2018 | Gaydos | H04W 72/0446 |
| 2021/0119820 A1* | 4/2021 | Matatyaou | H04L 41/069 |
| 2021/0367857 A1* | 11/2021 | Ovadia | G06N 20/00 |
| 2022/0078041 A1* | 3/2022 | Li | H04Q 11/0067 |
| 2022/0200863 A1* | 6/2022 | Kotalwar | H04L 41/0893 |

OTHER PUBLICATIONS

Ben-Soussan Yaniv: "Deploy vCMTS: Everything You Need to Know, and More", Mar. 12, 2020, (Mar. 12, 2020), pp. 1-4, XP055921822, Retrieved from the Internet: URL:https://www.harmonicinc.com/insights/blog/everything-you-need-to-know-about-deploying-vcmts [retrieved on May 17, 2022] the whole document.
Anonymous: "?TM Forum 2012 IPDR Streaming Protocol (IPDR/SP) Specification TMF8000-IPDR-IIS-PS TM Forum Approved Version 2.8", May 1, 2012 (May 1, 2012), pp. 1-75, XP055921980, Morristown, NJ 07960, USA. Retrieved from the Internet: URL: https://www.tmforum.org/resources/interface/ipdr-streaming-protocol-ipdrsp-specificationipdr_streaming_proptocol_tmf8000-ipdr-iis-ps_ver_2-8/ [retrieved on May 17, 2022] p. 6, paragraph [1.1.1], paragraph [2.3.2], paragraph [02.7].
International Search Report and Written Opinion RE: Application No. PCT/US2022/013196, dated May 30, 2022.

* cited by examiner

*Primary Examiner* — Gigi L Dubasky

(74) *Attorney, Agent, or Firm* — Chernoff, Vilhauer, McClung & Stenzel, LLP

(57) ABSTRACT

A system includes vCores and a messaging system to receive IPDR data. The IPDR data from the messaging system is transmitted by an IPDR exporter to an IPDR collector.

5 Claims, 6 Drawing Sheets

IPDR COMMUNICATION SYSTEM FOR VIRTUALIZED CORE SOURCES

CROSS REFERENCE TO RELATED APPLICATIONS

This application claims the benefit of U.S. Provisional Patent Application Ser. No. 63/139,941 filed Jan. 21, 2021.

BACKGROUND

The subject matter of this application relates to an IPDR communication system for vCores.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
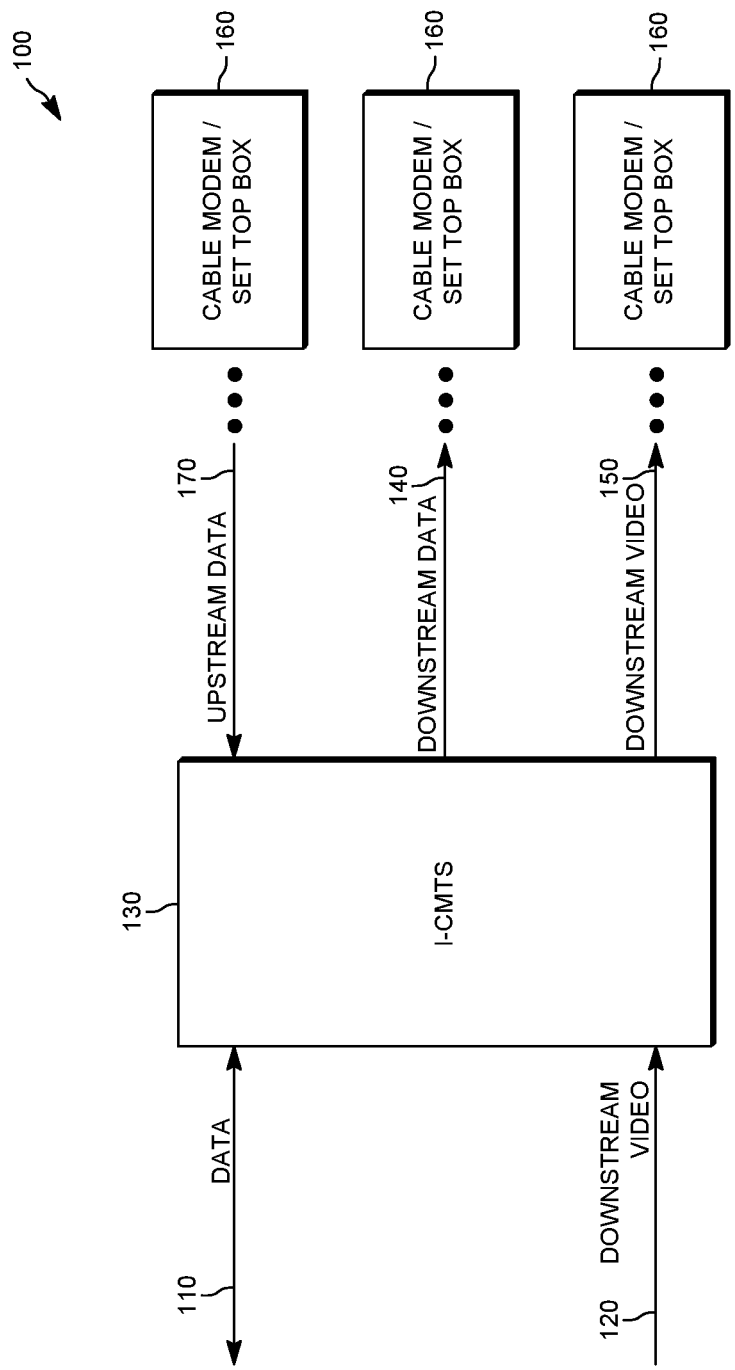
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
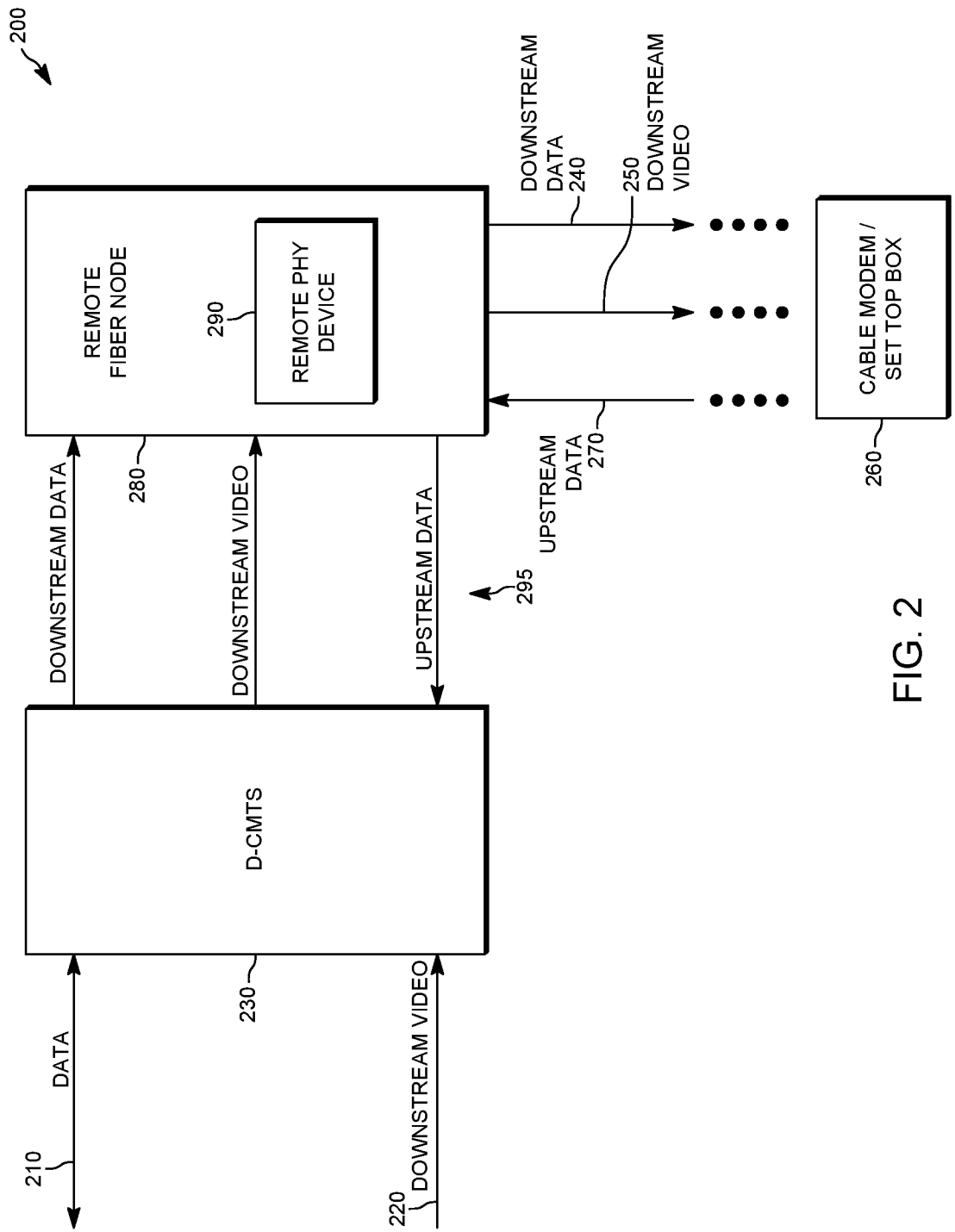
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOC SIS MAC and/or PHY layers down to the fiber node.

I-CMTS devices are typically custom-built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. Unfortunately, it is problematic to dynamically scale the number of line cards in a real-time manner to meet the demands of a particular network.

The computational power of microprocessor based commercial off the shelf (COTS) server platforms are increasing while the expense of such systems is decreasing over time. With such systems, a computing system may be, if desired, virtualized and operated using one or more COTS server, generally referred to herein as a virtual machine. Using container technologies running on the COTS server and/or virtual machine, the COTS server may operate with only a single operating system. Each of the virtualized applications may then be isolated using software containers, such that the virtualized application may not see and are not aware of other virtualized applications operating on the same machine. Typically, each COTS server includes one or more Intel/AMD processors (or other processing devices) with associated memory and networking capabilities running an operating system software. Typically, the COTS servers include a framework and an operating system where user applications are run on such framework and the operating system is abstracted away from the actual operating system. Each virtual machine may be instantiated and operated as one or more software applications running on a COTS server. A plurality of software containers may be instantiated and operated on the same COTS server and/or the same virtual machine. A plurality of COTS servers is typically included in one or more data centers, each of which are in communication with one another. A plurality of COTS server may be located in different geographic areas to provide geo-redundancy. In some embodiments, the container may include the same functionality as a virtual machine, or vice versa. In some embodiments, a grouping of containerized components, generally referred to as a pod, may be in the form of a virtual machine.

In some embodiments, the COTS servers may be "bare metal" servers that typically include an operating system thereon together with drivers and a portion of a container orchestration system. One or more containers are then added to the "bare metal" server while being managed by the container orchestration system. The container orchestration system described herein may likewise perform as, and be referred to as, a virtual machine orchestration system, as desired. In some embodiments, "bare metal" servers may be used with containers running on the operating system thereon together with drivers and a container orchestration system. In some embodiments, virtual machines may be omitted from the COTS servers.

Selected software processes that are included on a line card and/or a remote PHY device may be run on a "bare metal" server and/or virtual machine, including software containers, running on a COTS server, including both "active" and "back-up" software processes. The functionality provided by such a "bare metal" server and/or virtual machine may include higher level functions such as for example, packet processing that includes routing Internet packet provisioning, layer 2 virtual private networking which operates over pseudowires, and multiprotocol label switching routing. The functionality provided by such a "bare metal" server and/or virtual machine may include DOCSIS functions such as for example, DOCSIS MAC and encapsulation, channel provisioning, service flow management, quality of service and rate limiting, scheduling, and encryption. The functionality provided by such a "bare metal" server and/or virtual machine may include video processing such as for example, EQAM and MPEG processing.

Each of the COTS servers and/or the virtual machines and/or software containers may contain different hardware profiles and/or frameworks. For example, each of the COTS servers and/or "bare metal" servers and/or virtual machines and/or software containers may execute on different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or "bare metal" servers and/or virtual machines and/or software containers may have different processing capabilities that vary depending on the particular hardware. Each of the COTS servers and/or "bare metal" servers and/or the virtual machine and/or software containers may contain different software profiles. For example, each of the COTS servers and/or "bare metal" servers and/or virtual machines and/or software containers may include different software operating systems and/or other services running thereon, generally referred to herein as frameworks. In this manner, different COTS servers and/or "bare metal" servers and/or virtual machines and/or software containers may have different software processing capabilities that vary depending on the particular software profile.

Figure 3:
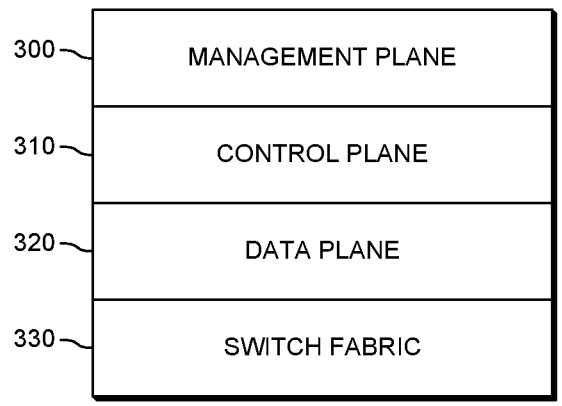
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

As the system increasingly scales to support additional customers, additional COTS servers and/or "bare metal" servers and/or virtual machines and/or software containers are included with the system to expand the processing capability of the overall system. To provide processing redundancy, one or more additional COTS servers and/or "bare metal" servers and/or virtual machines and/or software containers may be included that are assigned as "back-up" which are exchanged for an "active" process upon detection of a failure event. The scaling of the data plane 320 on COTS servers and/or "bare metal" servers and/or virtual machines and/or software containers to service dynamically variable processing requirements should be performed in such a manner that ensures sufficiently fast processing of data packets and sufficient bandwidth for the transmission of the data packets to ensure they are not otherwise lost.

It is desirable to virtualize the data plane, and in particular a portion of the Remote PHY functionality on a COTS server and/or "bare metal" servers. In this manner, the MAC cores for the cable distribution system may run on COTS servers and/or "bare metal" servers. By way of reference herein, a virtualized Remote PHY MAC Core may be referred to herein as a vCore instance.

Figure 4:
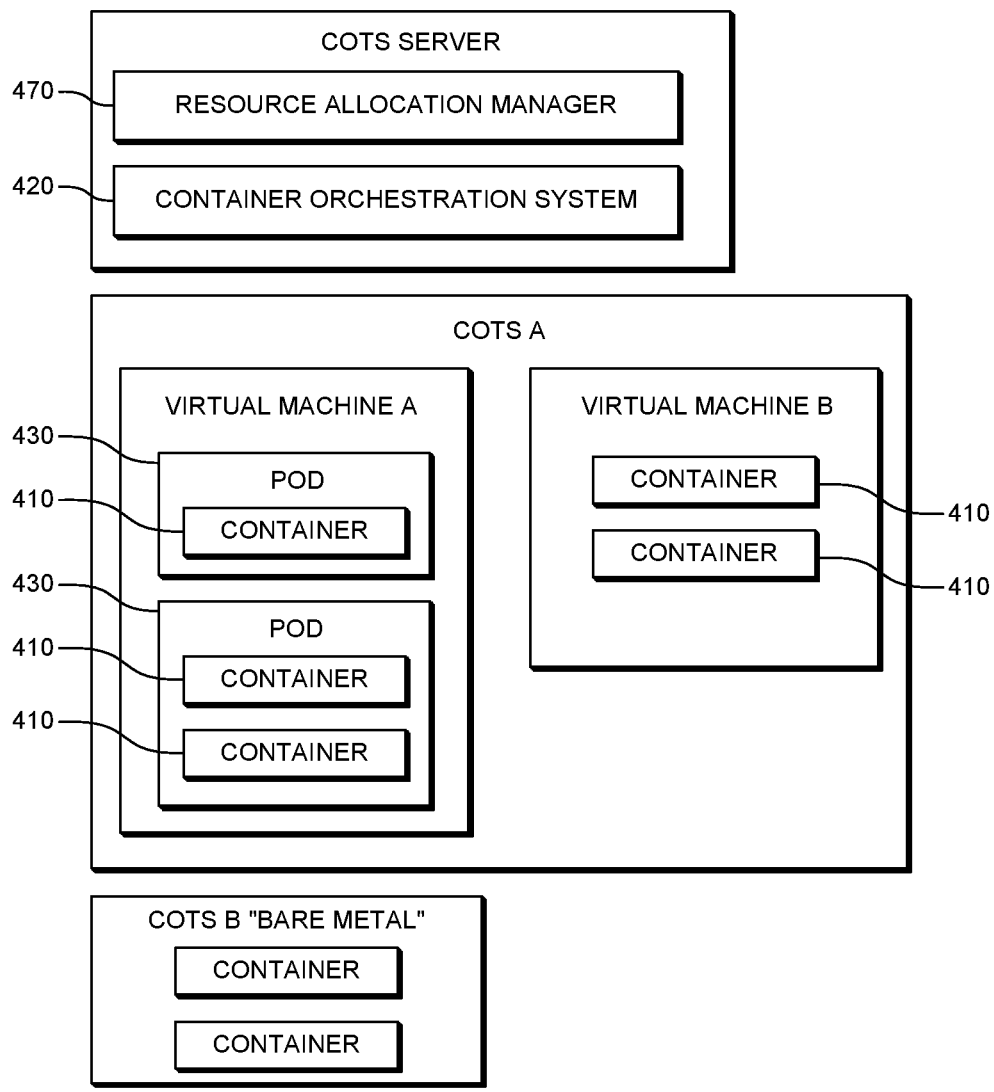
FIG. 4 illustrates a server system with a resource allocation manager and a container orchestration system.

Referring to FIG. 4, it is desirable to incorporate platform as a service that uses operating system level virtualization to deliver software in packages, generally referred to as containers 410. Each of the containers are isolated from one another and bundle their own software, libraries, and configuration files. The containers may communicate with one another using defined channels. As a general matter, one or more applications and its dependencies may be packed in a virtual container that can run on a COTS server and/or "bare metal" server and/or a virtual machine. This containerization increases the flexibility and portability on where the application may run, such as an on-premises COTS server, a "bare metal" server, a public cloud COTS server, a private cloud COTS server, or otherwise. With each container being relatively lightweight, a single COTS server and/or "bare metal" server and/or a virtual machine operating on a COTS server and/or "bare metal" server may run several containers simultaneously. In addition, the COTS server and/or "bare metal" server and/or the virtual machine and/or the containers may be distributed within the cable distribution system.

A COTS server and/or "bare metal" server and/or a virtual machine may include a container orchestration system 420 for automating the application deployment, scaling, and management of the containers 410 across one or more COTS servers and/or "bare metal" servers and/or virtual machines. Preferably the computing device running the container orchestration system 420 is separate from the computing device providing the containers for the dataplane applications. It is to be understood that the virtual machine illustrated in FIG. 4 may be omitted, such as the COTS B. The application deployment, scaling, and management of the containers may include clusters across multiple hosts, such as multiple COTS servers. The deployment, maintaining, and scaling, of the containers may be based upon characteristics of the underlying system capabilities, such as different processor types, different number of processing cores per processor, different amounts of memory for each processor type, different amounts of memory per processing core, different amounts of available off-processor memory, different memory bandwidth (DDR) speeds, different frameworks, and/or varying types and capabilities of network interfaces, such as Ethernet cards. Moreover, the container orchestration system 420 may allocate different amounts of the underlying system capabilities, such as particular processor types, a selected number of processors (e.g., 1 or more), a particular number of processing cores per selected processor, a selected amount of memory for each processor type, a selected amount of memory per processing core, a selected amount of available off-processor memory, a selected framework, and/or a selected amount and/or type of network interface(s), such as Ethernet cards. A corresponding agent for the container orchestration system 420 may be included on each COTS server (e.g., COTS A and/or COTS B).

The container orchestration system 420 may include a grouping of containerized components, generally referred to as a pod 430. A pod consists of one or more containers that are co-located on the same COTS server and/or "bare metal" server and/or the same virtual machine, which can share resources of the same COTS server and/or "bare metal" server and/or same virtual machine. Each pod 430 is preferably assigned a unique pod IP address within a cluster, which allows applications to use ports without the risk of conflicts. Within the pod 430, each of the containers may reference each other based upon a localhost or other addressing service, but a container within one pod preferably has no way of directly addressing another container within another pod, for that, it preferably uses the pod IP address or otherwise an addressing service.

A traditional D-CMTS RPHY Core may be implemented as a specially built appliance including both software and hardware to achieve desired performance characteristics, such as ensuring the timing of the transfer of data packets. The specially built appliance is not amenable to automatic deployment nor automatic scaling due to the fixed nature of its characteristics. In contrast to a specially built appliance, the vCore instance is preferably implemented in software operating on a COTS server and/or "bare metal" server on top of an operating system, such as Linux. The vCore instance is preferably implemented in a manner that readily facilitates automation techniques such as lifecycle management, flexible scaling, health monitoring, telemetry, etc. Unfortunately, running a vCore instance on a COTS server and/or "bare metal" server tends to result in several challenges, mostly related to the data plane components. One of the principal challenges involves ensuring that data is provided to the network in a timely and effective manner to achieve the real time characteristics of a cable data distribution environment. The cable data distribution environment includes real time constraints on the timing of data packet delivery, which is not present in typical web-based environments or database environments.

Each vCore instance is preferably implemented within a container, where the size (e.g., scale, memory, CPU, allocation, etc.) of each container translates into the amount of server hardware and software resources assigned to the particular vCore instance. The amount of server hardware and software resources assigned to each particular vCore instance is preferably a function of the number of groups of customers (e.g., service groups) and/or number of customers that the vCore instance can readily provide RPHY MAC Core services to. For example, a limited amount of server hardware and software resources may be assigned to a particular vCore instance that has a limited number of groups of customers and/or customers. For example, a substantial amount of server hardware and software resources may be assigned to a particular vCore instance that has a substantial number of groups of customers and/or customers. For example, selected server hardware resources are preferably allocated among the different vCore instances in a non-overlapping manner so that each vCore instance has a dedicated and predictable amount of server hardware resources. For example, selected software resources are preferably allocated among the different vCore instances in a non-overlapping manner so that each vCore instance has a dedicated and predictable amount of software resources. By way of example, a single vCore may be a Kubernetes pod that includes four containers, namely, (1) a vCore management container, (2) a dataplane container, (3) a control plane container, and (4) a vCore initialization container.

For example, the number of CPU cores preferably assigned to each vCore instance (Cc) may be a function of the total USSG (upstream service groups—groups of customer modems and/or set top boxes) (USsg) and the total DSSG (downstream service groups—groups of customer modems and/or set top boxes) (DSsg) connected through that vCore instance. This may be represented as vCore: $Cc=f_1$ (USsg, DSsg). Other hardware and/or software characteristics may likewise be assigned, as desired.

For example, the network capacity assigned to each vCore instance (Cbw) may be a function of the of the total USSG (upstream service groups—groups of customer modems and/or set top boxes) (USsg) and the total DSSG (downstream service groups—groups of customer modems and/or set top boxes) (DSsg) connected to that vCore instance. This may be represented as $Cbw=f_2$ (USsg, DSsg). Other hardware and/or software characteristics may likewise be assigned, as desired.

The scaling of the vCore instance may refer to the capability to automatically create and deploy a vCore instance within a container on a COTS server and/or "bare metal" server and/or virtual machine that is appropriately sized to serve a particular set of remote physical devices and/or service groups (e.g., sets of cable customers) and/or cable customers. The scaling of the vCore instance may also include, in some cases, the capability to automatically modify the hardware and/or software characteristics of an existing vCore instance within a POD on a COTS server and/or "bare metal" server and/or virtual machine to be appropriately sized to serve a modified particular set of remote physical devices and/or service groups (e.g., sets of cable customers) and/or cable customers.

A resource allocation manager 470 may assign or reallocate a suitable amount of hardware and software of the COTS server and/or "bare metal" server resources to each particular vCore instance (e.g., CPU cores, and/or memory, and/or network capacity). The amount of such COTS server and/or "bare metal" server hardware and software resources assigned to or reallocate to each vCore instance may be a function of its scale and also other features, such as various other resource allocations. A corresponding agent for the resource allocation manager 470 may be included on each COTS server (e.g., COTS A, COTS B).

The vCore instance includes data plane software for the transfer of data packets and other functions of the data plane. The data plane software may include a set of data plane libraries and network interface controller (NIC) drivers that are used to manage the data packets for the data plane. Preferably, the data plane software operates in user space, as opposed to Kernel space like typical network processing software, thus it does not make use of the operating system kernel and container management network drivers and plugins. For example, the data plane software may include a queue manager, a buffer manager, a memory manager, and/or a packet framework for packet processing. The data plane software may use CPU cores that are isolated from the Kernel, meaning that the operating system scheduled processes are not running on these isolated CPU cores. The separation of the CPU cores between the data plane software and the operating system software ensures that tasks performed by the operating system software does not interfere with the data plane software processing the data packets in a timely manner. In addition, the separation of the CPU cores between the data plane software and the operating system software enables both to use the same physical central processing unit, albeit different cores, of the same physical central processing unit. In addition, other hardware and/or software capabilities may likewise be separated, such as for example, selected processors (e.g., 1 or more), particular number of processing cores per selected processor, selected amount of memory for each processor type, selected amount of memory per processing core, selected amount of available off-processor memory, selected framework, and/or selected amount and/or type of network interface(s).

It is also desirable for each vCore instance to have dedicated network bandwidth capability apart from other vCore instances and the operating system software. To provide dedicated network bandwidth for a vCore instance, the physical network interface cards may be virtualized so that a plurality of different software applications can make use of the same network interface card, each with a guaranteed amount of bandwidth available. The network interface cards are preferably virtualized using a single root input/output virtualization technique (SR-IOV). The SR-IOV partitions the NIC physical functions (e.g., PFs) into one or more virtual functions (VFs). The capabilities of the PFs and VFs are generally different. In general, the PF supports queues, descriptions, offloads, hardware lock, hardware link control, etc. In general, the VF supports networking features based upon queues and descriptors.

The automated creation, deployment, and removal of vCore instances may be performed by the container orchestration system 420.

Figure 5:
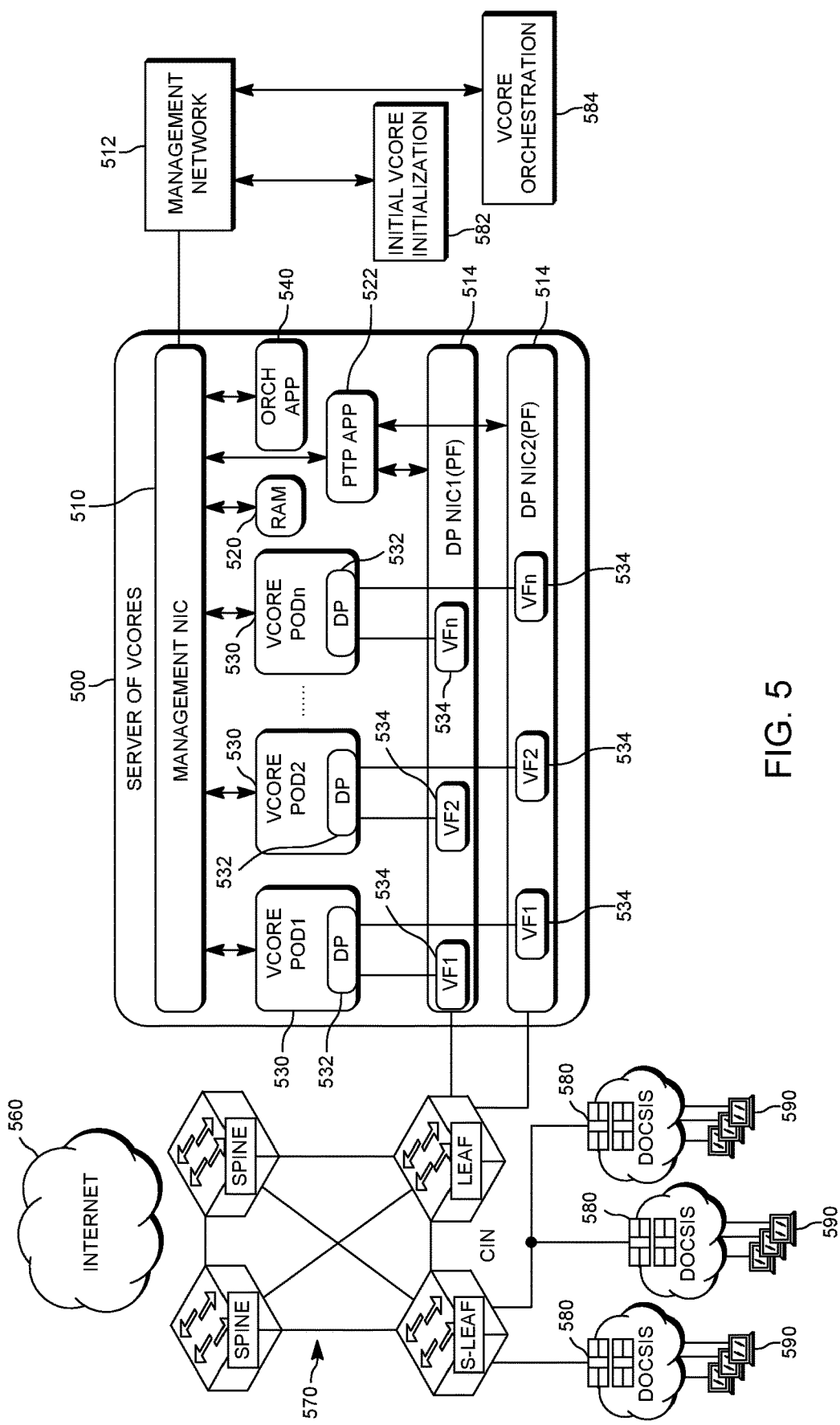
FIG. 5 illustrates a server system with containers and a container orchestration system.

Referring to FIG. 5, the vCore instances 530 may operate on a COTS server and/or "bare metal" server 500 acting as a remote PHY MAC core for one or more remote physical devices connected over a converged interconnect network, normally located in the same hub. The vCore instances 530 may include data plane software 532. Each of the vCore instances 530 as generally referred to as a POD. The COTS server 500 may communicate with the Internet 560, a set of networking switches 570, to remote physical devices 580, and the customers 590. The COTS server and/or "bare metal" server including the vCore instances operating thereon is typically a relatively high-performance server that has one or more of the following characteristics:

Hardware:

At least one management NIC 510 is connected to, usually, a separate management network 512. The management NIC 510 is primarily used for orchestration and management of the server application, which may also manage the data traffic.

Preferably at least two (for redundancy) data plane NICs 514 (i.e., data plane physical network interfaces) together with SR-IOV and PTP (IEEE 1588) 522 are included for hardware timestamping capabilities of the data packets. The data plane NICs 514 are used to provide connectivity to the remote physical devices and the customer modems and/or set top boxes/consumer premises equipment behind such remote physical devices. The vCore instances 530 may each include a virtual function 534 network interface to each of the data plane NICs 514.

In addition, the hardware may include dedicated devices for DES encryption.

Software:

Preferably the operating system on the COTS server and/or "bare metal" server is a LINUX OS such as Ubuntu, Redhat, etc.

The COTS Server and/or "bare metal" server and/or virtual machine includes container software.

The COTS Server and/or "bare metal" server and/or virtual machine and/or other server includes at least a part of a container orchestration system.

The COTS Server and/or "bare metal" server and/or virtual machine and/or other server includes a resource allocation manager (RAM) 520 that manages, at least in part, the server allocation of software and/or hardware resources for vCore instances, including for example: CPU Cores, memory, VFs, MAC addresses, etc. The RAM 520 may also provide server configuration, including OS configuration, driver support, etc., diagnostics and health monitoring. The COTS Server and/or "bare metal" server and/or virtual machine and/or other server may include an orchestration app 540 that manages, at least in part, the management of the vCores (e.g., containers and/or pods).

The COTS Server and/or "bare metal" server and/or virtual machine and/or other server may run the PTP application 522 that synchronizes the system clock of the COTS Server and/or "bare metal" server and/or virtual machine and/or vCore instances 520 based upon a grand master clock for the system as a whole. For increased accuracy, the PTP application 522 is preferably based upon hardware time stamping and a Precise Hardware Clock that is present on the NICs 514.

The container initialization and resource allocation for the containers may be performed in a distributed fashion. An initial vCore initialization 582 may be used to perform, or otherwise cause to be performed, a default configuration of an instantiated vCore. A vCore orchestration 584 may be used to perform, or otherwise cause to be performed, a management of the instantiated vCores together with allocation of resources for particular vCores. In this manner, the initial vCore initialization 582 and the vCore orchestration 584 work together to instantiate vCores, allocate resources to vCores, and manage the resourced instantiated vCores. The initial vCore initialization 582 preferably operates in conjunction with the orchestration app 540 on the server to instantiate the default vCores. The vCore orchestration 584 preferably operates in conjunction with the orchestration app 540 on the server to perform the orchestration of the vCores. The vCore orchestration 584 preferably operates in conjunction with the RAM 520 to allocate recourses for the vCores.

As noted previously, the COTS server that includes vCore instances has allocation of resources that are managed, at least in part, by the RAM 520. During the COTS server startup phase the RAM may create multiple resource pools (CPU Cores, data plane network VFs, encryption VFs, etc.), after which the RAM may assign or lease resources from each pool to vCore PODs upon deployment as requested by the container orchestration system 540. In addition, the RAM 520 may manage data encryption and decryption that may be selectively off loaded to dedicated hardware, as desired.

The RAM 520 may include a REST API that may be used to assign and free up resources, and which may also be used to determine resource availability and allocation status. The RAM 520 may also checkpoint periodically the resource pools status to an in-memory key-value database cache with durability and use that cached data in the event of a COTS server crash. The in-memory key-value database cache is preferably unsuitable for readily random access and is more suitable for reconstruction of the data back into memory in the event that the COTS server crashes.

A vCore instance configuration is typically composed of at least two parts. The first part may be the RPHY Mac Core configuration. The RPHY Mac Core configuration includes, for example, the DOCSIS, RF, RPD, cable-mac, IP addressing, routing, etc. The second part may be the data plane configuration 532. The data plane configuration 532 and in particular a virtualized data plane for RPHY MAC Core devices configuration includes, for example, CPU Core Ids that are used by the data plane 532, data plane network VF addresses that are used by the data plane 432, MAC addresses for the interfaces, encryption VFs addresses that are used for encryption offload, memory allocation, etc. In many embodiments, the RPHY Mac Core configuration is provided by the multiple system operators prior to actual configuration. The vCore instance of the data plane 532 may be determined based upon the resource information received from the RAM 520 by the vCore instance itself during the initialization phase. As a general matter, the vCore preferably performs the MAC layer functionality.

As previously described, a vCore is, in general, a software implementation of a CMTS core which includes data plane functionality that routes data packets between the public Internet and consumer premises equipment. The ability of a vCore to provide CMTS services is a function of the capabilities of the underlying hardware, which is typically a COTS server. Such COTS servers maintained within a data center typically include one or more processors, each of which normally includes an integrated plurality of cores (e.g., 4, 8, 16, 20, or more). In general, each core of each processor may be considered as its own computing system in that it has its own instruction pipeline, decoder, stack, and available memory. A software program that is decomposable into smaller parallel processing chunks may be substantially accelerated by scheduling the independent processing chunks to different cores of a multi-core processor and executing the independent processing chunks in at least a partial parallel manner. For example, a set of 10 independent functions can be split onto 10 cores and, if each function takes the equivalent time to complete, will execute generally 10 times faster than running all the 10 independent functions on a single core of a single core processor or on a single core of a multi-core processor. Accordingly, decomposing a software program into sub-programs and scheduling the sub-programs to be executed simultaneously on multiple cores of a processor provides acceleration of the processing and increases the efficiency of the hardware in terms of running more instructions per second when considering all the cores within the processor.

For a vCore, it is often desirable to reserve at least one of the cores for selective compute intensive operations, such as real-time data plane packet processing to maximize the performance throughput of the data packets.

Depending on the computing resources likely necessary for a set of one or more service groups, it is desirable to provide a vCore with sufficient computing resources to provide effective and timely processing. By way of example, allocating too few cores and/or vNIC bandwidth to a vCore will starve the service of resources, resulting in a reduced quality of service to customers. Also, depending on the computing resources likely necessary for a set of one or more service groups, it is desirable to provide a vCore without excessive computing resources to provide effective and timely processing. By way of example, allocating too many cores and/or reserving too much vNIC bandwidth to a vCore will not utilize the overall COTS server hardware efficiently leaving unused capabilities on the COTS server. Appropriate selection of one or more cores and/or vNIC bandwidth for a vCore is desirable. Further, it is desirable to efficiently install and configure vCores to allocate appropriate resources.

Figure 6:
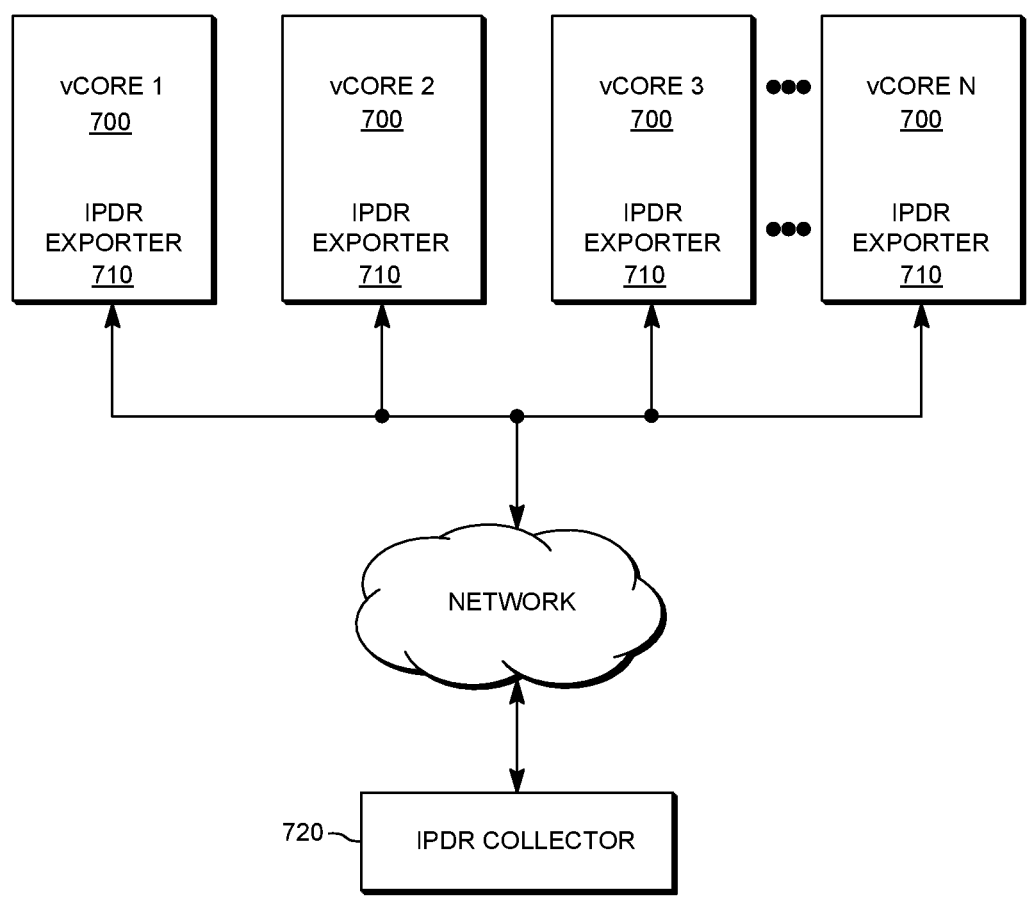
FIG. 6 illustrates a set of vCores with a respective IPDR exporter interconnected with an IPDR collector.

Referring to FIG. 6, each of the vCores 700 may use an Internet Protocol Detail Record (i.e., IPDR) streaming protocol to collect and record data traffic statistics produced on a network. The IPDR protocol is a service integrated with the DOCSIS protocol. A vCore collects information about Internet Protocol based service usage on a per customer basis. In this manner, the IPDR data may contain information about every flow inside a vCore and consumption usage information about each customer device (e.g., a cable modem) on the network. As it may be observed, the IPDR data may include information related to the customer. The IPDR data may include various different types of data, such as charging and billing which facilitates business applications. The IPDR data may also include network information regarding network capacity, customer usage, proactive network maintenance, downstream data usage, upstream data usage, customer identification, vCore identification, vCore configuration, vCore usage, customer configuration, etc. Other types of IPDR data may include, for example, vCore name, system up time, vCore system up time, vCore IPv4 address, vCore IPv6 address, cable modem mac address, cable modem IPv4 address, cable modem IPv6 address, cable modem quality of service version, cable modem registration status value, cable modem last registration time, etc. The IPDR data that is collected by each vCore is transmitted by a respective IPDR exporter 710 to a centrally located IPDR collector 720. The IPDR collector 720 periodically receives updates from respective IPDR exporters 710. By way of example, an IPDR schema type may be collected based upon time (e.g., every 15 minutes), when an event triggers it (e.g., cable modem resets), and when the IPDR collector asks for the data (e.g., ad hoc). In this manner, a substantial amount of data is collected regarding network characteristics, vCore characteristics, customer characteristics, and data usage of the network, vCore, and customer. The IPDR exporter 710 captures data on a per customer basis and generates IPDR data (e.g., data objects) that are transmitted over the network to the IPDR collector 720 that periodically gathers and reports the received data asynchronously. With a substantial number of vCores, such as hundreds of vCores, it results in a substantial number of TCP/IP connections, which may be burdensome to the IPDR collector 720. Also, the IPDR exporter tends to require computational resources on the corresponding server hosting the vCore that may not be readily available. Further, the management and configuration, inclusive of the assignment of IP addresses of respective IPDR exporters, of a substantial number of IPDR exporters for respective vCores is burdensome.

Figure 7:
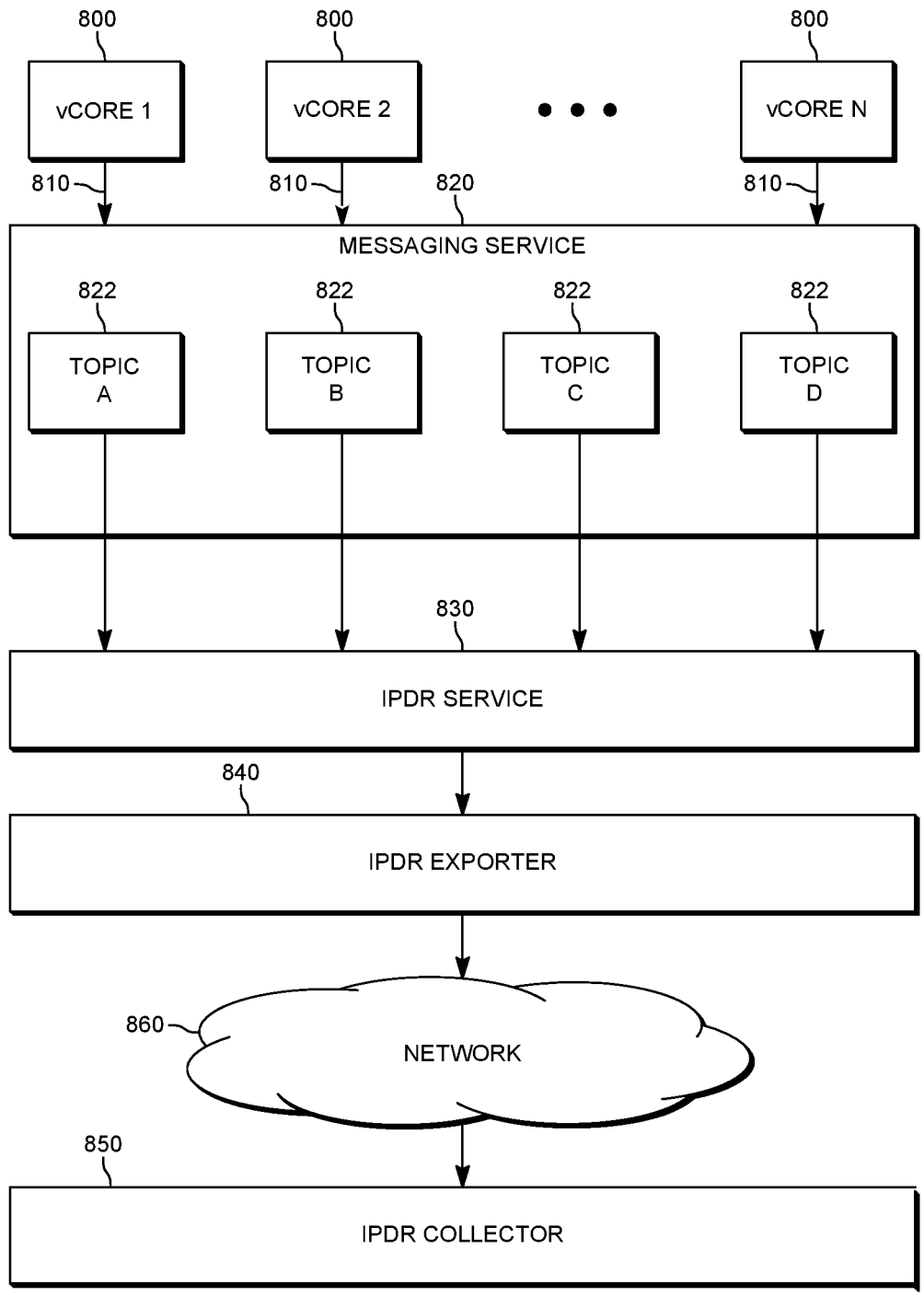
FIG. 7 illustrates a set of vCores, a messing service, an IPDR exporter interconnected with an IPDR collector.

Referring to FIG. 7, to reduce the limitations associated with the architecture of FIG. 6, it is desirable not to use an IPDR exporter on each of the vCores to provide the IPDR data to the IPDR collector for the periodic gathering of the IPDR data. Rather than the respective vCore acting as an individual IPDR exporter, each of the respective vCores 800 provides the data for IPDR 810 to a messaging service 820.

The messaging service 820 is preferably a stream processing service suitable for real time data feeds. The messaging service preferably uses a binary TCP based protocol that uses a "message set" abstraction that groups messages together as "topics" 822. The topics 822 facilitate the grouping of different types of data into different groups. By way of example, the upstream vCore data may be provided within a topic of "usUtilStats" matching upstream statistics. By way of example, the downstream vCore may be provided within a topic of "dsUtilStats" matching downstream statistics. By way of example, the cable modem IPv6 address data may be provided within a topic of "CPE". Also, different selected data may be grouped together into a single topic. In this manner, all of the IPDR data is selectively provided to one of the topics. Also, each of the respective vCores provides their respective IPDR data to the same set of topics in the same manner. Accordingly, each topic of the messaging service will have all the IPDR data for that topic from all of the vCores. Preferably, the data sets included in the respective topics are preferably different from one another. The messaging service may be implemented using any suitable technique, such as Apache Kafka. Apache Thrift may be used to define the data that is placed into the messaging service for each record type supported, where each record type uses a separate message topic.

An IPDR service 830 consumes the data within each of the topics 822 thereby removing the data from the messaging service 820. The IPDR service 830 thereby receives all of the IPDR data 810 from each of the vCores 800 in an organized manner from the messaging service 820.

An IPDR exporter 840 receives the data from the IPDR service 830 and provides the IPDR data in the form of a single stream included in an Internet Protocol Detail Record (i.e., IPDR) streaming protocol. The IPDR exporter 840 is configured to provide the Internet Protocol Detail Record (i.e., IPDR) streaming protocol to an IPDR collector 850 across a network 860. The IPDR collector 850 includes a single interconnection to receive data from a plurality of vCores from an IPDR exporter 840. The IPDR streaming protocol is preferably compliant with the IPDR/SP specification (2004), incorporated by reference herein in its entirety. The IPDR exporter 840 is responsible for the connection to the IPDR collector 850, for maintaining a session for each type of IPDR session, and for sending the data to the IPDR collector 850. In this manner, the configuration of the system from the IPDR collector's 850 perspective appears to include a single IPDR exporter 840, while at the same time supporting a substantial number of vCores which in turn support a substantial number of customers. The IPDR service 830 and the IPDR exporter 840 service may be separate services or combined, as desired.

The IPDR exporter 840 includes a restful service (e.g., REST API—REpresentational State Transfer) which exposes an API in a secure, uniform, and stateless manner to the calling client. The REST API may be used to provision IPDR session types, the IPDR exporter, as well as the IPDR collector. Also, the APIs may be integrated into a user interface to (1) enable or disable the IPDR exporter running; (2) provision, and enable or disable the IPDR collector; (3) provision the IPDR exporter as an acceptor or initiator of connections to the IPDR collector; (4) enable or disable selected IPDR sessions types, preferably in a manner consistent with the topics; (5) retrieve information for what IPDR collector is active for an IPDR session type; and (6) retrieve IPDR exporter service statistics. Preferably the IPDR exporter provides for managing IPDR data collection on vCores by using a network cloud-based service that provides REST APIs.

In another embodiment, the IPDR exporter and IPDR collector may be replaced by a service that directly reads the data from the messaging service and makes it available for subsequent analysis.

Part of the job of the aggregation is to control the amount of active sessions to the IPDR collector. Each IPDR record type is a single session to the IPDR collector. In DOCSIS IPDR, each record type has an IPDR session ID associated with it. The IPDR exporter service maintains this behavior. When streaming IPDR data, the protocol may use an "IPDR START" message, followed by many IPDR data packets, and ended with an "IPDR STOP" message. As a result of the data aggregation, there may be several start and stop messages for the same IPDR data type, since many vCores are included. For example, the collection of IPDR time-based data may be staggered among hundreds of vCores. As soon as the vCore writes to the messaging system, the IPDR service may consume the data and the IPDR exporter can send the data. The IPDR collectors may handle the distinction between the plurality of vCores in any suitable manner, such as using the vCore host name inside the IPDR messages.

It is noted that the IPDR service and IPDR exporter need not treat event nor time based IPDR data differently, with each vCore collecting the time based and event based IPDR data and placing the data in the messaging system.

The IPDR collector may include a special type of IPDR collection, generally referred to herein as ad hoc, where the IPDR collector asks for IPDR data for a specific IPDR type from a respective vCore. The ad hoc IPDR requests may be handled in any suitable manner. One manner of handling an ad hoc IPDR request is for the IPDR collector to send a message to one or more vCores for specific IPDR record type. In response, the vCores write data to an ad hoc message type, which is then processed and provided to the IPDR collector as previously described. Another manner of handling an ad hoc is for the IPDR collector to collect the requested IPDR record type data using a SNMP (or other technique) based request to the vCore. The IPDR record type data is created and streamed out to the IPDR collector in a manner separate from the messaging system.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An Internet Protocol Detail Record data acquisition system comprising:
   (a) a head end connected to a plurality of first customer devices through a transmission network that includes a remote fiber node that converts received data to analog data suitable to be provided on a coaxial cable for said plurality of first customer devices, where said head end includes at least one server each of which includes a respective processor;
   (b) a plurality of virtualized Cable Modem Termination Systems instantiated on one of said at least one server of said head end configured to provide data plane services to said plurality of first customer devices through said transmission network;

(c) said plurality of virtualized Cable Modem Termination Systems posting data suitable for an Internet Protocol Detail Record to a messaging service in a manner that does not include an Internet Protocol Detail Records Streaming Protocol, where said messaging service simultaneously maintains said posted data from each of said plurality of virtualized Cable Modem Termination Systems;

(d) an Internet Protocol Detail Record Service that receives said posted data from said messaging service and providing data in a manner that includes an Internet Protocol Detail Records Streaming Protocol to an Internet Protocol Detail Record exporter;

(e) said Internet Protocol Detail Record exporter that receives said provided data from said Internet Protocol Detail Record Service and provides Internet Protocol Detail Record data to an Internet Protocol Detail Record collector.

2. The system of claim 1 wherein said Internet Protocol Detail Record data is a data object.

3. The system of claim 1 wherein said messaging service is a stream processing service.

4. The system of claim 1 wherein said messaging service groups together different types of data into different topics.

5. The system of claim 4 wherein at least two of said topics has non-overlapping types of data.

\* \* \* \* \*